Patented May 31, 1932

1,861,176

UNITED STATES PATENT OFFICE

MELVIN DE GROOTE, OF ST. LOUIS, MISSOURI, ASSIGNOR, BY MESNE ASSIGNMENTS, TO TRETOLITE COMPANY, OF WEBSTER GROVES, MISSOURI, A CORPORATION OF MISSOURI

PROCESS FOR PREVENTING ACCUMULATION OF SOLID MATTER IN OIL WELLS, PIPE LINES AND FLOW LINES

No Drawing.   Application filed December 31, 1926.   Serial No. 158,413.

This invention relates to a process that is intended to be used to prevent the accumulation of solid matter in oil wells and pipe lines that are producing or which contain "non-cutting oil", or a mixture of such oil and brine, i. e., oil that is either anhydrous or which does not have emulsifying properties or a tendency to emulsify while it is traveling upwardly through the casing of the well or traveling through the flow line.

In many oil wells in which liquid consisting of non-cutting oil or a mixture of such oil and water is produced, deposits of paraffin, wax, asphalt, sand, insoluble alkaline earth compounds and other solid materials collect in objectionable quantities on the well tubing, on the casing, on the inside of the strainer and in the working barrel of the well pump, thereby causing the production of the oil well to be materially decreased. Some or all of these materials also accumulate in oil lines or conduits through which liquids of the kind mentioned travel, such, for example, as surface lines connected to wells, and pipe lines through which oil is transported from oil fields. The presence of these deposits of solid material necessitates cleaning out the wells and the oil lines at more or less frequent intervals, in order to maintain production of wells and capacity of flow lines or pipe lines.

I have discovered that such cleaning operations can be eliminated if liquid comprising non-cutting oil, located at the bottom of a substantially clean well or at the entrance of a substantially clean oil line, such as a flow line or pipe line is subjected to such treatment as to cause the undesirable solid materials in said liquid to be held in solution, suspension or dispersion, namely, in a non-flocculated condition, so that they will escape from the well or travel through the oil line without liability of becoming deposited on the pumping equipment in the well, or on the interior of the oil line. Accordingly, I have devised a simple chemical process for keeping an oil well or an oil line of the kind previously mentioned in operative condition. My process is restricted to use with wells that are producing liquids of the kind described and oil lines through which such liquids are flowing, and the process consists in introducing into the bottom of such a producing well, or introducing at the entrance of such a flowing oil line a water-soluble or oil-soluble deflocculent agent, consisting of a suitable hydrogenated aromatic or a mixture of two or more suitable hydrogenated aromatics, for causing paraffin, wax, asphalt, sands, inorganic soluble compounds, or other solid materials in the non-cutting oil or in the water that is produced with the oil, to be held in a non-flocculated condition, thereby eliminating the possibility of said solid materials becoming deposited at points where they will interfere with the pumping operation or reduce or impede the flow of the oil from the well or through the flow line. The term "soluble agent", as herein used, is intended to mean an agent that is soluble wth at least one of the liquids with which it comes in contact.

The hydrogenated aromatics which I prefer to use in producing the deflocculent agent or treating agent contemplated by my process are such materials as hydrogenated phenol, hydrogenated napthalene, etc. They may be hydrogenated cresols, or allied bodies. They are sold under the commercial names of methyl-cyclo-hexanol, hexalin tetralin, etc. I have found that the simpler modifications of these hydrogenated aromatics, such as chlorine derivatives or the sulphonic acids, such as tetralin sulphonic acid to be as valuable as the unaltered hydrogenated aromatics.

The introduction of a treating agent of the kind above described into the bottom of a producing well or at the entrance of a flowing oil line that is producing or which contains non-cutting oil, results in the suspension or dispersion of the paraffin, wax, asphalt, sand, inorganic insoluble compounds and other objectionable solid materials in the oil, and thus eliminates the possibility of said solid materials becoming deposited where they will interfere with the pumping operation or reduce or impede the flow of the oil through the oil line. The treating agent can be introduced into the well or into the oil line in any suitable manner, as, for example, by pouring it down the casing or tubing of a producing well, or by pouring it into a flowing oil line adjacent to the point where the oil enters the line, it only being necessary to use a very minute quantity of said treating agent, on account of the fact that the one function which said agent is intended to perform is to hold the objectionable solid materials in the oil in solution, suspension or dispersion. The treating agent can be used in a concentrated state, or as a solution in oil, or as a solution or suspension in water.

I am aware of the fact that some of the objectionable solid materials of the kind above mentioned that accumulate in oil wells and oil lines are capable of being dissolved by hydrogenated aromatics, but this characteristic of organic materials which collect in oil wells and flow lines is not the determining factor by which it is possible to calculate the result produced by my process. For example, a large proportion of the solid materials that collect in oil wells and oil lines are of an inorganic nature, such as floating sand, but the treating agent contemplated by my process has no solvent power for sand, and consequently, cannot be said to dissolve the inorganic solids in the oil, due to the solvent action of the hydrogenated aromatics. Furthermore, as my process contemplates using a very minute quantity of the treating agent, usually one part of treating agent to from five thousand to fifteen thousand parts of oil, it is obvious that the efficiency of the treating agent and the result that is attained by its use is not due to its solvent action on the inorganic or organic solids in the oil.

I am aware of the fact that United States patent to A. C. Campbell, No. 1,513,371, dated October 28, 1924, discloses a process for removing deposits from pipe lines used for conveying crude oil, that contemplates passing through the pipe line a composition consisting of soda ash, sal soda, sodium bicarbonate and naphtha mixed with water, so as to dissolve the sediment and heavy oily matter which has collected on the inner surface of the pipe line, but the sole function of said process is to clean or effect the removal of deposits from pipe lines that are in a dirty condition or partially clogged condition. My process is entirely different, and not only is not intended to be used for the same purpose as the Campbell process, but is not capable of accomplishing the same result as the Campbell process. In my process the agent that is introduced into a well or into a flow line will not dissolve deposits of solid matter that have collected on the inner surface of the well tubing or flow line, and thus effect the removal of said deposits. On the contrary, in my process it is necessary to start with a flow line or producing well that is clean or substantially free from deposits of solid matter, and the result attained by the agent that is introduced into the well or flow line is to keep the solid matter in the water or oil in a non-flocculated condition, thereby preventing said solid matter from collecting on the inner surface of the well tubing or flow line.

A further distinction between my process and the Campbell process is that the agent used by the Campbell process must necessarily be introduced into a flow line when the line is not being used for conveying crude oil, due, of course, to the fact that the sole purpose of the process is to clean out the line, whereas, in my process the agent is, in most instances, introduced into a well that is in pumping operation or introduced into a flow line through which oil is flowing, due to the fact that the function performed by the agent is to keep, hold or maintain the solid matter in such a condition that it will not adhere to or collect on the well tubing or flow line, and thus retard the travel of the liquid through the same.

Having thus described my invention, what I claim as new and desire to secure by Letters Patent is:

A process for preventing the accumulation of solid matter in an oil well or pipe line, characterized by introducing into a substantially clean producing well or oil flowing line that is producing or which contains liquid comprising non-cutting oil, a minute quantity of a soluble deflocculent agent comprising a material selected from the group consisting of hydrogenated phenol, hydrogenated naphthalene, hydrogenated cresol, methylcyclo-hexanol, hexalin, tetralin and tetralin sulfonic acid, for holding the solid material in said liquid in a non-flocculent condition.

MELVIN DE GROOTE.